(12) United States Patent
Yamakawa

(10) Patent No.: US 8,374,432 B2
(45) Date of Patent: Feb. 12, 2013

(54) IMAGE PROCESSING APPARATUS, IMAGE FORMING APPARATUS, IMAGE PROCESSING METHOD, AND COMPUTER PROGRAM PRODUCT

(75) Inventor: Shinji Yamakawa, Kanagawa (JP)

(73) Assignee: Ricoh Company, Limited, Tokyo (JP)

( * ) Notice: Subject to any disclaimer, the term of this patent is extended or adjusted under 35 U.S.C. 154(b) by 918 days.

(21) Appl. No.: 12/480,930

(22) Filed: Jun. 9, 2009

(65) Prior Publication Data

US 2009/0324068 A1  Dec. 31, 2009

(30) Foreign Application Priority Data

Jun. 30, 2008  (JP) ................................. 2008-170058
Apr. 13, 2009  (JP) ................................. 2009-097122

(51) Int. Cl.
*G06K 9/34* (2006.01)
(52) U.S. Cl. ......... 382/176; 382/199; 382/164; 358/2.1; 358/462
(58) Field of Classification Search .................. 382/173, 382/176, 180, 254, 261, 266, 199, 164; 358/1.9, 358/2.99, 3.01, 462, 464, 2.1
See application file for complete search history.

(56) References Cited

U.S. PATENT DOCUMENTS

| | | |
|---|---|---|
| 5,204,752 A | 4/1993 | Yamakawa |
| 5,206,718 A | 4/1993 | Yamakawa |
| 5,801,844 A | 9/1998 | Yamakawa et al. |
| 5,809,366 A | 9/1998 | Yamakawa et al. |
| 5,892,595 A | 4/1999 | Yamakawa et al. |

(Continued)

FOREIGN PATENT DOCUMENTS

| | | |
|---|---|---|
| JP | 2803852 | 7/1998 |
| JP | 2951972 | 7/1999 |

(Continued)

OTHER PUBLICATIONS

U.S. Appl. No. 08/778,762, filed Jan. 6, 1997, Koichi Noguchi, et al.

(Continued)

*Primary Examiner* — Jon Chang
(74) *Attorney, Agent, or Firm* — Oblon, Spivak, McClelland, Maier & Neustadt, L.L.P.

(57) ABSTRACT

An image processing apparatus includes a scanner that receives image data, an area extracting unit that extracts image data of visually different image areas from the received image data, an HDD that stores therein the extracted image data, a criterion storage unit that stores a plurality of criteria for identifying each of the image areas as one of processing areas, a device interface unit that receives a selection of an image segmentation mode from a user, a selecting unit that selects a criterion from the criteria stored in the criterion storage unit based on the selected image segmentation mode, and a processing unit that identifies each of the image areas as one of the processing areas based on the selected image segmentation mode and performs image processing corresponding to the identified processing area.

5 Claims, 9 Drawing Sheets

U.S. PATENT DOCUMENTS

| | | |
|---|---|---|
| 6,014,462 A | 1/2000 | Yamakawa |
| 6,655,861 B2 | 12/2003 | Yamakawa |
| 6,880,122 B1 * | 4/2005 | Lee et al. .................. 715/209 |
| 6,965,695 B2 | 11/2005 | Yamakawa |
| 7,085,013 B2 | 8/2006 | Yamakawa |
| 7,139,100 B2 | 11/2006 | Yamakawa |
| 2003/0118234 A1 | 6/2003 | Tanaka et al. |
| 2004/0246533 A1 | 12/2004 | Touura |
| 2004/0262378 A1 | 12/2004 | Ooki |
| 2006/0082831 A1 | 4/2006 | Gotoh et al. |
| 2006/0165285 A1 | 7/2006 | Adachi |
| 2006/0256383 A1 | 11/2006 | Yamakawa |
| 2006/0274388 A1 * | 12/2006 | Miyazawa et al. ............ 358/527 |

FOREIGN PATENT DOCUMENTS

| | | |
|---|---|---|
| JP | 3134756 | 12/2000 |
| JP | 3176052 | 4/2001 |
| JP | 2004-112695 | 4/2004 |
| JP | 2007-189275 | 7/2007 |

OTHER PUBLICATIONS

U.S. Appl. No. 08/043,736, filed Apr. 7, 1993, Shinji Yamakawa.

Office Action issued Jan. 6, 2011 in China Application No. 200910149192.1 (With English Translation).

* cited by examiner

IMAGE SEGMENTATION MODE (STANDARD)

| | EDGE AREA | PICTURE AREA | COLOR AREA |
|---|---|---|---|
| COLOR-TEXT-EDGE AREA | YES | NO | YES |
| BLACK-TEXT-EDGE AREA | YES | NO | NO |
| OTHERS (PICTURE) | NO | – | – |
| OTHERS (PICTURE) | YES | YES | – |

IMAGE SEGMENTATION MODE (TEXT)

|  | EDGE AREA | PICTURE AREA | COLOR AREA |
|---|---|---|---|
| COLOR-TEXT-EDGE AREA | YES | NO | YES |
| COLOR-TEXT-EDGE AREA | YES | YES | – |
| BLACK-TEXT-EDGE AREA | YES | NO | NO |
| OTHERS (PICTURE) | NO | – | – |

| IMAGE PROCESSING MODE | BLACK-TEXT-EDGE AREA | COLOR-TEXT-EDGE AREA | OTHERS (PICTURE) |
|---|---|---|---|
| PHOTOGRAPH | OTHERS (PICTURE) | OTHERS (PICTURE) | OTHERS (PICTURE) |
| STANDARD | BLACK-TEXT-EDGE AREA | COLOR-TEXT-EDGE AREA | OTHERS (PICTURE) |
| TEXT | BLACK-TEXT-EDGE AREA | COLOR-TEXT-EDGE AREA | COLOR-TEXT-EDGE AREA |

2102

IMAGE PROCESSING APPARATUS, IMAGE FORMING APPARATUS, IMAGE PROCESSING METHOD, AND COMPUTER PROGRAM PRODUCT

CROSS-REFERENCE TO RELATED APPLICATIONS

The present application claims priority to and incorporates by reference the entire contents of Japanese priority document 2008-170058 filed in Japan on Jun. 30, 2008 and Japanese priority document 2009-097122 filed in Japan on Apr. 13, 2009.

BACKGROUND OF THE INVENTION

1. Field of the Invention

The present invention relates to a technology for controlling processing contents of image processing in an image processing apparatus.

2. Description of the Related Art

When image processing is to be performed on optically-read image data, processing contents of the image processing are typically changed depending on a type of the image data. For example, when the image of the image data mainly contains text, binarization and the like is performed on the image data to sharpen edges of the text, and, when an image of the image data mainly contains photograph and the like, image processing that can maintain color tone of the image is performed on the image data. To change the processing contents in this manner, it is necessary to properly identify contents of the image of the image data.

Japanese Patent Application Laid-open No. H3-64257 discloses a technology for setting a criterion for identifying contents of image data (hereinafter, "image type") as either a line image or a halftone image so that a user can identify the image type according to users' preference.

In the conventional technology disclosed in Japanese Patent Application Laid-open No. H3-64257, when image data stored in a storage unit is to be reprinted, the image data can be reprinted only based on the image type identified under a previously-set criterion is stored in the storage unit. However, there is a demand for changing the image type before reprinting the image data depending on a use purpose of the image data.

However, in the conventional technology, if an image of image data has been printed out once, the image data is stored in the storage unit in a format obtained after the image data has been subjected to image processing such as the binarization process according to the image type identified based on the previously-set criterion. Therefore, the image type of the image data stored in the storage unit cannot be changed at a later stage. Thus, if the user wants to change the image type, it is necessary to re-read an original of the image data.

SUMMARY OF THE INVENTION

It is an object of the present invention to at least partially solve the problems in the conventional technology.

According to an aspect of the present invention there is provided an image processing apparatus including a data receiving unit that receives image data; an extracting unit that extracts pieces of image data corresponding to visually different image areas of an image of the image data received by the data receiving unit; a first storage unit that stores therein the pieces of the image data extracted by the extracting unit; a second storage unit that stores therein a plurality of criteria for identifying each of the image areas as one of processing areas that are subjected to different image processing depending on an image segmentation mode for segmenting the image data into the processing areas; a mode receiving unit that receives a selection of the image segmentation mode from a user; a criterion selecting unit that selects one of the criteria stored in the second storage unit based on the image segmentation mode selected by the user by using the mode receiving unit; an area identifying unit that identifies each of the image areas of the pieces of the image data stored in the first storage unit as one of the processing areas based on the criterion selected by the criterion selecting unit; and an image processing unit that performs image processing associated with each of the processing areas on the processing areas identified by the area identifying unit.

According to another aspect of the present invention there is provided an image forming apparatus including a data receiving unit that receives image data; an extracting unit that extracts pieces of image data corresponding to visually different image areas of an image of the image data received by the data receiving unit; a first storage unit that stores therein the pieces of the image data extracted by the extracting unit; a second storage unit that stores therein a plurality of criteria for identifying each of the image areas as one of processing areas that are subjected to different image processing depending on an image segmentation mode for segmenting the image data into the processing areas; a mode receiving unit that receives a selection of the image segmentation mode from a user; a criterion selecting unit that selects one of the criteria stored in the second storage unit based on the image segmentation mode selected by the user by using the mode receiving unit; an area identifying unit that identifies each of the image areas of the pieces of the image data stored in the first storage unit as one of the processing areas based on the criterion selected by the criterion selecting unit; and an image processing unit that performs image processing associated with each of the processing areas on the processing areas identified by the area identifying unit.

According to still another aspect of the present invention there is provided an image processing method implemented by an image processing apparatus including a first storage unit that stores therein pieces of image data corresponding to visually different image areas of an image of original image data; and a second storage unit that stores therein a plurality of criteria for identifying each of the image areas as one of processing areas that are subjected to different image processing depending on an image segmentation mode for segmenting the image data into the processing areas. The image processing method including first receiving including receiving image data; extracting the pieces of the image data corresponding to the image areas from the image data received at the first receiving; storing the pieces of the image data corresponding to the image areas extracted at the extracting in the first storage unit; second receiving including receiving a selection of the image segmentation mode from a user; identifying each of the image areas as one of the processing areas based on the selection of the image segmentation mode received at the second receiving; and performing image processing associated with each of the processing areas on the processing areas identified at the identifying.

According to still another aspect of the present invention there is provided a computer program product comprising a computer usable medium having computer readable program codes embodied in the medium that, when executed, causes a computer to execute the above image processing method.

The above and other objects, features, advantages and technical and industrial significance of this invention will be better understood by reading the following detailed description of presently preferred embodiments of the invention, when considered in connection with the accompanying drawings.

BRIEF DESCRIPTION OF THE DRAWINGS

FIG. 9 is a schematic diagram illustrating criteria stored in the criterion storage unit, which indicates correspondence between signals when the image segmentation mode is a text mode;

FIG. 10 is a schematic diagram illustrating processing contents of processing performed on each area in each image processing mode;

DETAILED DESCRIPTION OF THE PREFERRED EMBODIMENTS

Exemplary embodiments of the present invention are explained in detail below with reference to the accompanying drawings. While the present invention is applied to an image forming apparatus in the following embodiments, the present invention can be applied to devices other than the image forming apparatus.

In the following explanation, the image forming apparatus is assumed to be a multifunction peripheral (MFP) having functions of a copier, a facsimile (FAX), a scanner, and a data transmission device that transmits an input image (e.g., an image of an original read by the scanner or an image input by the printer or the FAX) to other devices. However, the image forming apparatus can be a device other than the multifunction peripheral.

Figure 1:
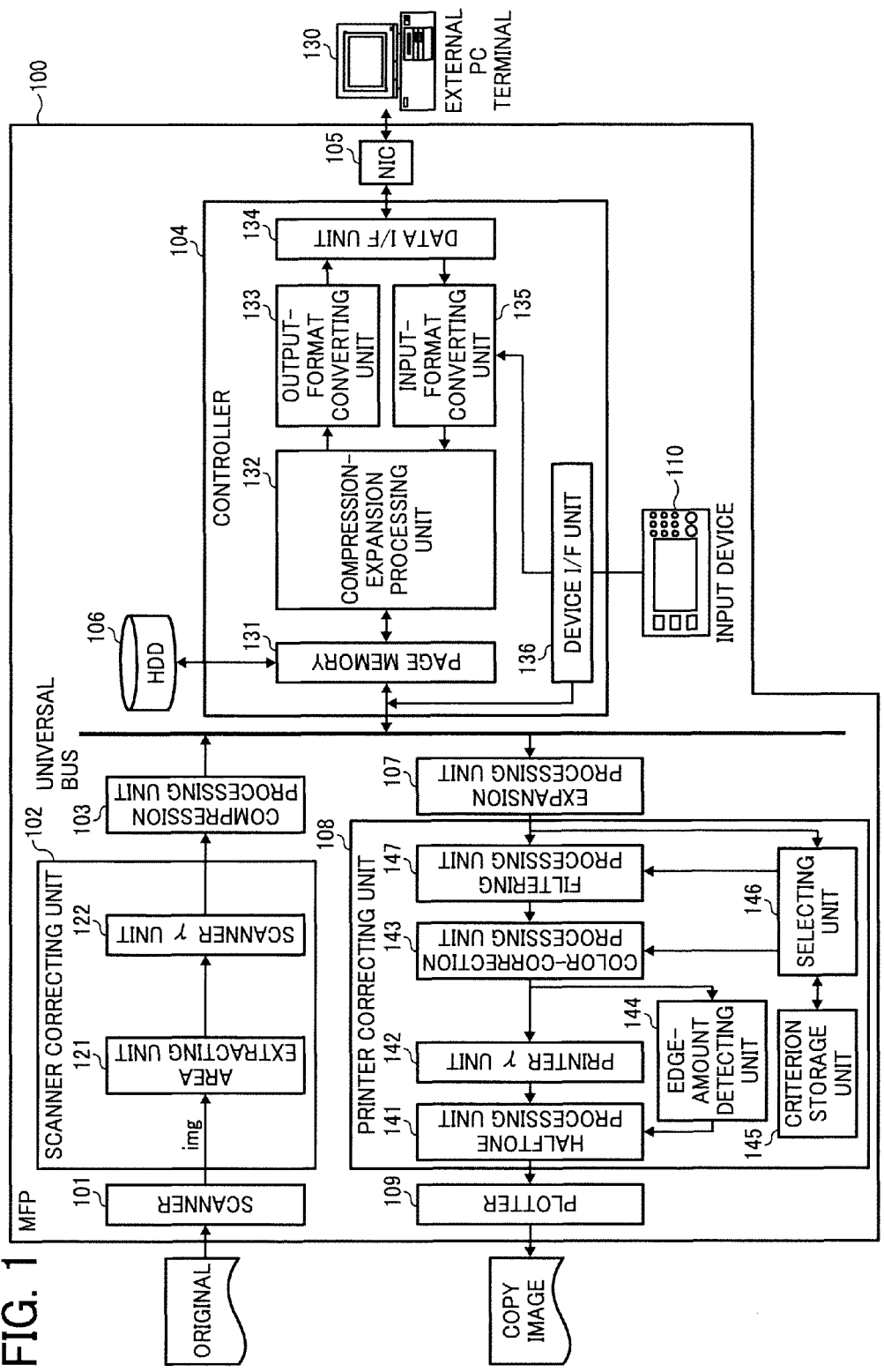
FIG. 1 is a block diagram of a multifunction peripheral (MFP) according to an embodiment of the present invention.

FIG. 1 is a block diagram of an MFP 100 according to an embodiment of the present invention. The MFP 100 includes a scanner 101, a scanner correcting unit 102, a compression processing unit 103, a controller 104, a network interface card (NIC) 105, a hard disk drive (HDD) 106, an expansion processing unit 107, a printer correcting unit 108, a plotter 109, and an input device 110. The MFP 100 is connected to an external personal computer (PC) terminal 130 via a network.

The HDD 106 is a storage unit and it is used to store image data, information contained in various signals, and the like. A device other than the HDD 106 can be employed as the storage unit to store various data. For example, typical storage units such as an optical disk, a memory card, and a random access memory (RAM) can be employed as the storage unit.

A user uses the input device 110 for inputting various instructions or data. That is, the user controls operations, i.e., selects functions, sets parameters etc., of the MFP 100 by using the input device 110.

Image data of an original acquired by the scanner 101 by scanning the original is stored in the HDD 106. When performing a copy process, which is one example of executable processes, the MFP 100 receives a selection of an image segmentation mode from a user via the input device 110, and performs processes to print out an image of the image data based on the received image segmentation mode.

The image segmentation mode is way of specifying a priority area when each area in an image of image data is identified as a text area, a picture area, and the like. That is, the image segmentation mode specifies, when a certain area of the image can be identified as both the text area and the picture area, whether the area is to be identified as the text area or the picture area. The MFP 100 performs predetermined image processing with respect to each area identified based on the image segmentation mode. In other words, the image segmentation mode is used for segmenting the image of the image data into a plurality of processing areas that are to be subjected to different image processing, respectively. It is assumed below that a standard mode and a text mode can be selected as the image segmentation mode.

In the text mode, an area that may contain text is preferentially extracted as a text edge area. That is, when a certain area may contain text, even if the area may also contain a picture and the like that can be extracted as the picture area, that area is preferentially extracted as the text area.

In the picture mode, an area that may contain a picture is preferentially extracted as the picture area. That is, when a certain area may contain a picture, even if the area may also contain text that can be extracted as the text area, that area is preferentially extracted as the picture area.

When the MFP 100 performs the copy process, the scanner 101 optically reads an original, converts an analog signal obtained through optical reading of the original into a digital signal (e.g., 600 dots per inch (dpi)), and outputs the digital signal as image data.

The scanner correcting unit 102 includes an area extracting unit 121 and a scanner γ unit 122. The scanner correcting unit 102 extracts image data from each of a text area, a line image area, a photograph area, and the like of an image of the image data received from the scanner 101, and performs image processing such as a filtering process on RGB data of the input image data.

Specifically, the area extracting unit 121 extracts the image data corresponding to visually different areas of the image of the input image data (linear reflectance data). The image data corresponding to the areas can be extracted by using various methods, such as the method disclosed in Japanese Patent Application Laid-open No. 2003-259115.

More particularly, the area extracting unit 121 extracts image data corresponding to two different areas, that is, an edge area and a picture area other than the edge area (e.g., a photograph area). The edge area corresponds to an area in which an edge that may be an edge of text is detected. The picture area corresponds to an area other than the edge area, for example, a photograph area and the like.

The area extracting unit 121 also extracts a color area from the image of the input image data. The color area corresponds to an area in which color content other than black content is drawn on a white background.

The area extracting unit 121 assigns a segmentation signal to each pixel of the input image data based on the extracted areas (e.g., the edge area, the picture area, and the color area). The segmentation signal contains information for identifying the areas. More particularly, the segmentation signal contains 3-bit information containing a text separation signal (2 bits) and a color area signal (1 bit). A type of an area of each pixel can be identified from the contents of the segmentation signal.

The text separation signal (2 bits) contains text information (1 bit) indicating whether a pixel corresponds to a text edge and picture information (1 bit) indicating whether the pixel corresponds to the picture area. Specifically, when no white background is detected as a result of extracting a white area and a halftone-dot is detected as a result of extracting a halftone-dot, which will be described later, information indicating the picture area is set in the picture information.

The color area signal (1 bit) contains information indicating whether the pixel corresponds to the color area (in which color content other than black content is drawn on a white background).

Figure 2:
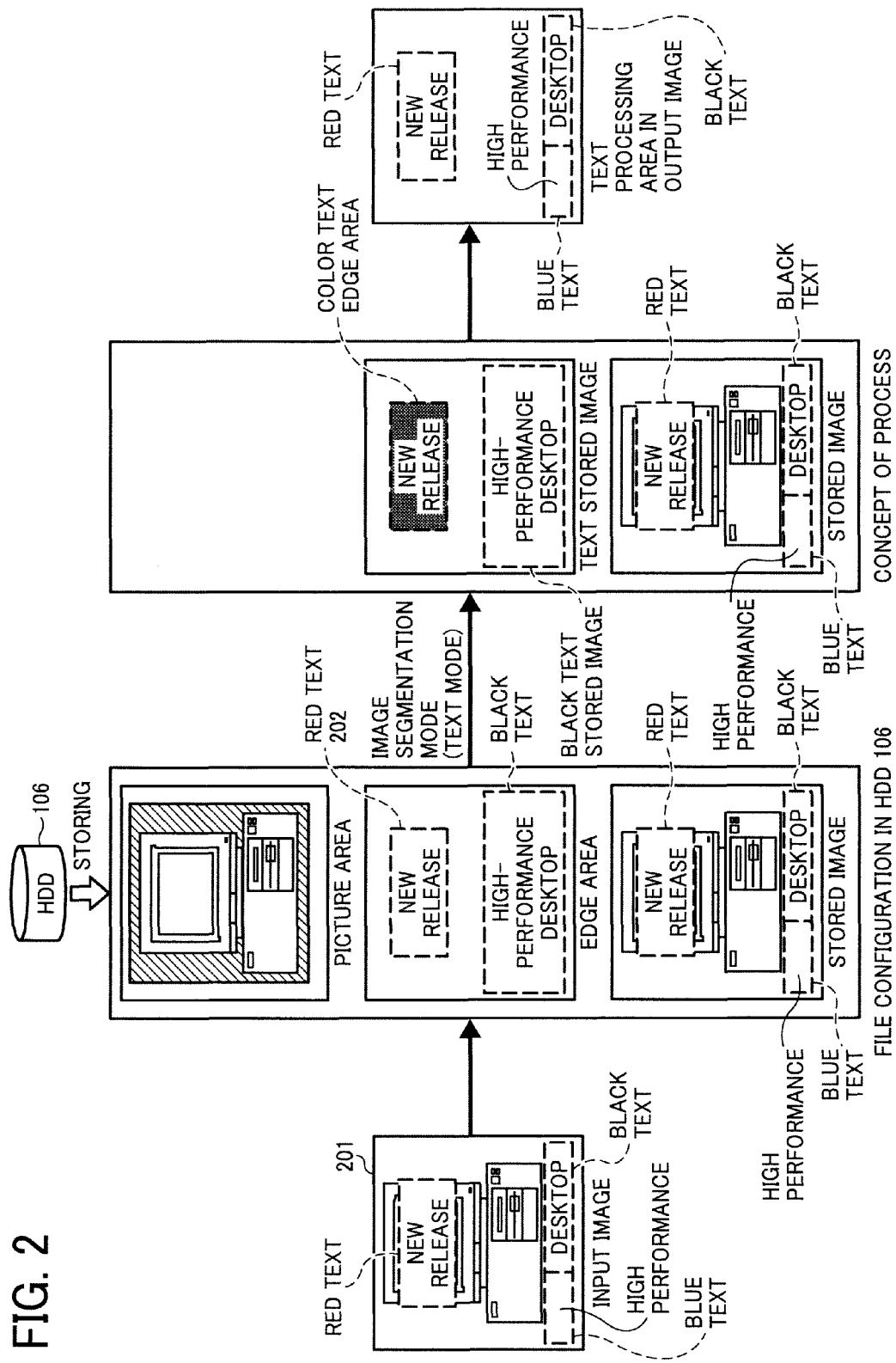
FIG. 2 is a schematic diagram for explaining a picture area and an edge area according to the embodiment.

FIG. 2 is a schematic diagram for explaining various areas in an image of image data according to the embodiment. Input image data 201 is stored in the HDD 106 as stored image data. The area extracting unit 121 extracts the image data corresponding to the picture area and the edge area from the input image data 201. Then, image data corresponding to the picture area and the edge area are stored in the HDD 106, i.e., in addition to the stored image data.

When receiving a request of printing an image of the image data stored in the HDD 106, it is identified whether each pixel of the stored image data corresponds to a color-text-edge area, a black-text-edge area, or the picture area based on the image segmentation mode input by a user at the time of inputting the request.

The black-text-edge area is an area in which an edge of black text is present on a white background. The color-text-edge area is an area in which an edge of color text other than the black text is present on a white background.

In the example shown in FIG. 2, an area 202 containing color text "new release" corresponds to both the edge area and the color area (although the diagram is not color). When the text mode is selected as the image segmentation mode, the area 202 is identified as the color-text-edge area, so that the text "new release" is processed as a color text edge. On the other hand, when the standard mode is selected as the image segmentation mode, the area 202 is identified as the picture area. Thus, a criterion for identifying the area is changed depending on whether the text mode or the standard mode is selected as the image segmentation mode.

In the embodiment, whether an area is to be extracted as the color-text-edge area or the picture area is determined based on the image segmentation mode selected by a user. However, it is applicable to make such a determination based on the color-text-edge area and other intermediate processes.

When the standard mode is selected as the image segmentation mode and the text "new release" is thereby identified as a picture, and if the size of the text is small, the readability of the determination could be low. However, when the text mode is selected as the image segmentation mode as shown in FIG. 2, the text "new release" is identified as text, and a process suitable for the text is performed on all areas that may contain text including the area containing the text "new release".

Therefore, the readability of the text "new release" in an output image can be increased.

Thus, when the stored image data is reprinted, a desired image can be output based on the selection of the image segmentation mode.

The area extracting unit 121 outputs image data corresponding to the edge area, image data corresponding to the picture area, the stored image data, and the segmentation signal of each pixel of the stored image data.

Figure 3:
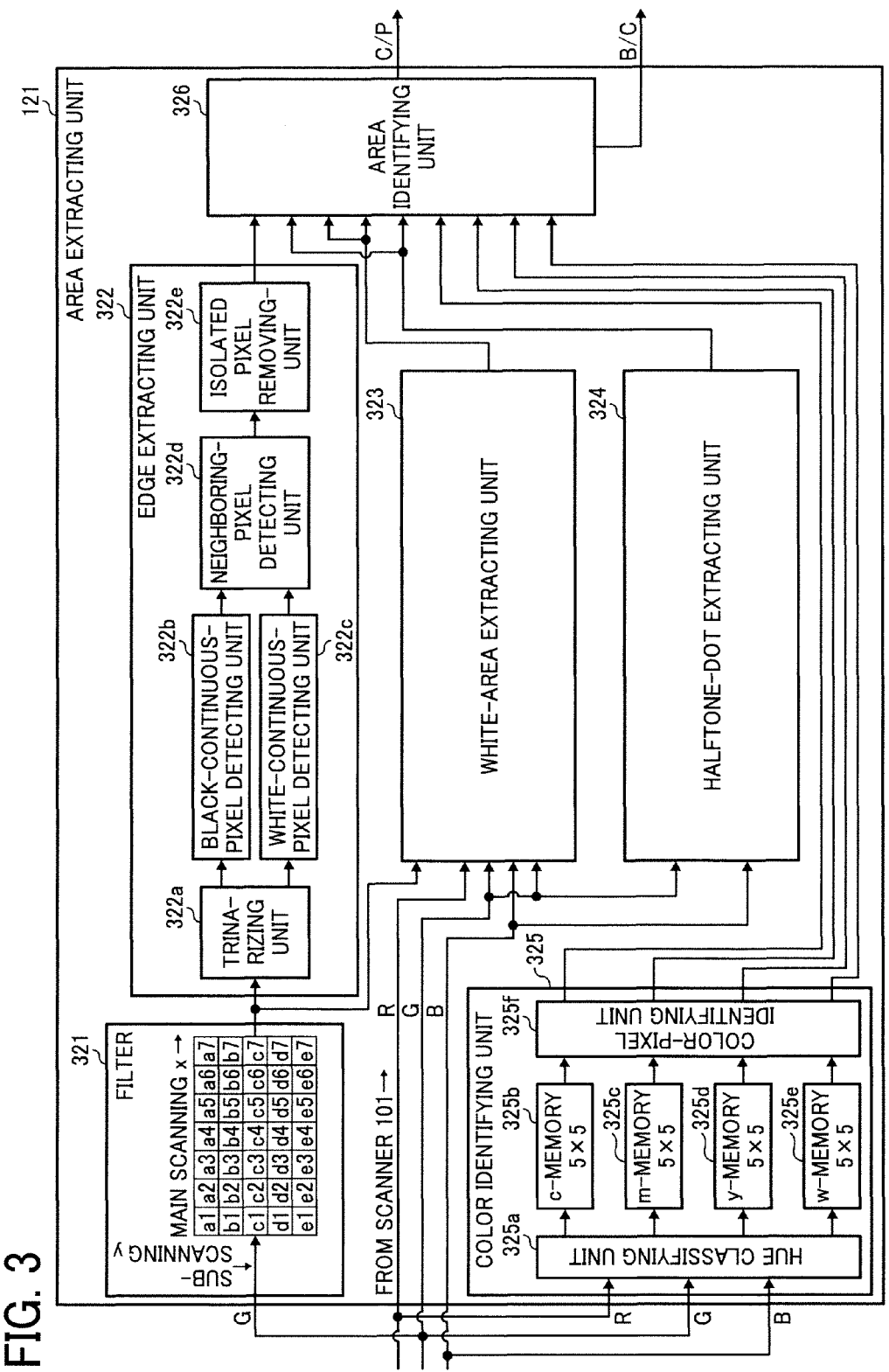
FIG. 3 is a block diagram of an area extracting unit shown in FIG. 1.

FIG. 3 is a detailed block diagram of the area extracting unit 121. The area extracting unit 121 includes a filter 321, an edge extracting unit 322, a white-area extracting unit 323, a halftone-dot extracting unit 324, a color identifying unit 325, and an area identifying unit 326.

The filter 321 is used for intensifying green (G) image data of the image data received from the scanner 101 to extract an edge of text of the image data.

The edge extracting unit 322 includes a trinarizing unit 322a, a black-continuous-pixel detecting unit 322b, a white-continuous-pixel detecting unit 322c, a neighboring-pixel detecting unit 322d, and an isolated-pixel removing unit 322e. In the embodiment, it is assumed that the G image data is referred to when an edge of the text is extracted. However, other data or signals that represent shading, such as brightness data, can be used instead of the G image data.

The text area is generally formed of only pixels having high densities (hereinafter, "black pixels") and pixels having low densities (hereinafter, "white pixels"), and more particularly, edge portions of text in the text area are formed of black continuous pixels and white continuous pixels. Based on this fact, the black-continuous-pixel detecting unit 322b detects continuity of black pixels and the white-continuous-pixel detecting unit 322c detects continuity of white pixels. Then, the neighboring-pixel detecting unit 322d detects neighboring pixels of black continuous pixels and white continuous pixels, and the isolated-pixel removing unit 322e removes isolated pixels (pixels corresponding to a predetermined condition). The edge extracting unit 322 then identifies the edge area based on results from the above units.

The white-area extracting unit 323 identifies an area in which content is drawn on a white background as a white area, an area around dark black text as the white area, and an area having a low density as a non-white area with respect to each image data.

The halftone-dot extracting unit 324 extracts halftone dots from an image of the image data, and identifies the extracted halftone dots as a halftone-dot area.

The color identifying unit 325 includes a hue classifying unit 325a, a c-memory 325b, an m-memory 325c, a y-memory 325d, a w-memory 325e, and a color-pixel identifying unit 325f. The hue classifying unit 325a classifies pixels into hues of cyan, magenta, yellow, and white, and stores the pixels in the c-memory 325b, the m-memory 325c, the y-memory 325d, and the w-memory 325e based on a result of the classification. The color-pixel identifying unit 325f identifies color (chromatic) pixels and black (achromatic) pixels of the image data based on the information stored in the memories 325b to 325e.

Figure 4:
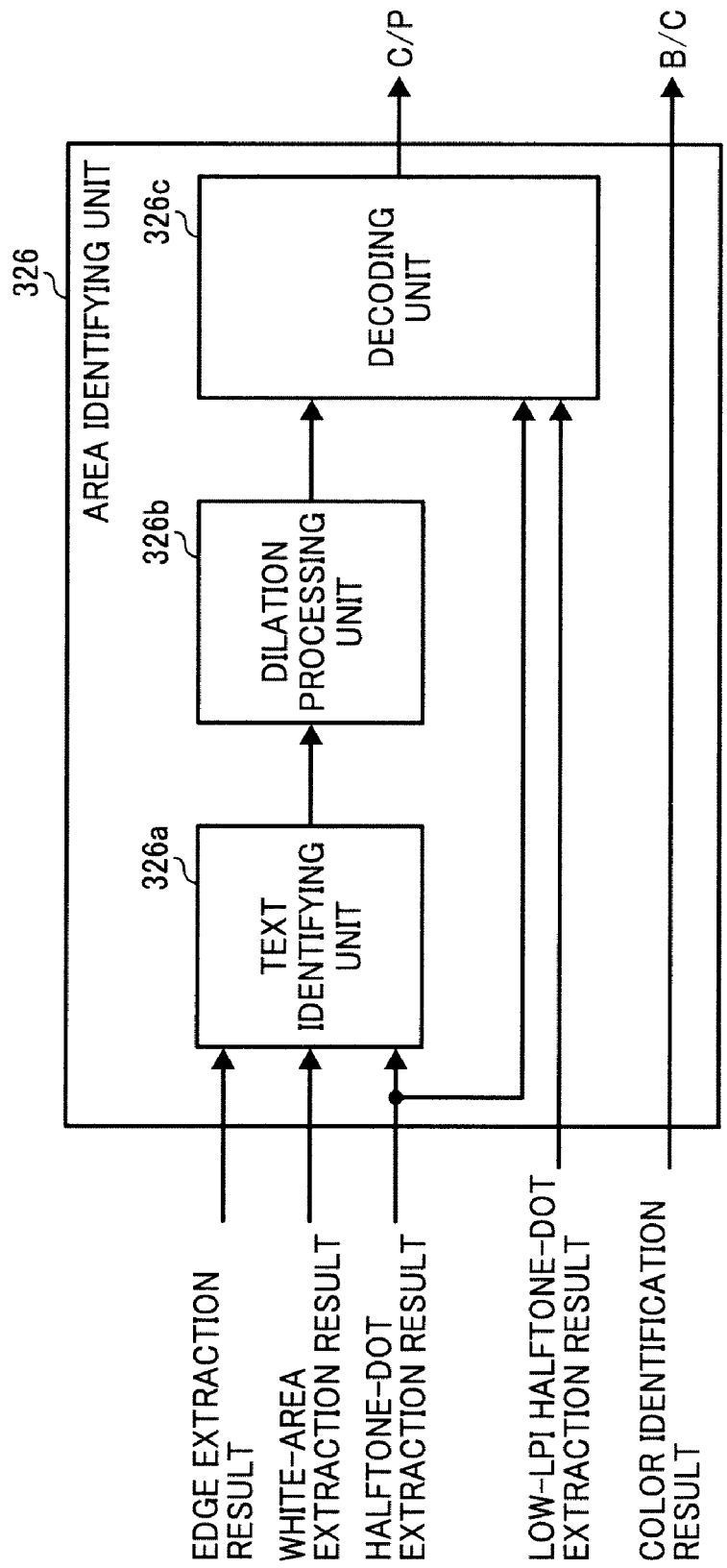
FIG. 4 is a block diagram of an area identifying unit shown in FIG. 3.

The area identifying unit 326 comprehensively identifies an area of each pixel. FIG. 4 is a detailed block diagram of the area identifying unit 326. The area identifying unit 326 includes a text identifying unit 326a, a dilation processing unit 326b, and a decoding unit 326c.

The text identifying unit 326a identifies a pixel of the image data as a text edge when the pixel corresponds to the edge area based on a result from the edge extracting unit 322, does not correspond to the halftone-dot area based on the result from the halftone-dot extracting unit 324, and corresponds to the white area based on a result from the white-area extracting unit 323. Otherwise, the text identifying unit 326a identifies the pixel as a non-text edge (i.e., the pixel is either a picture or a part of text).

The dilation processing unit 326b performs OR operation on 8×8 blocks based on a result from the text identifying unit 326a, and then performs AND operation on 3×3 blocks based on the result from the text identifying unit 326a to dilate the text edge by four pixels. That is, when at least one of 8×8 pixels around a target pixel is identified as the text edge, that the target pixel is assumed to be in the text edge area, and then, when all of 3×3 pixels around the target pixel are identified as the text edge area, the target pixel is identified as the text edge. Then, the target pixel and four adjacent pixels, i.e., five pixels in total, are identified as the text edge area.

The dilation processing unit 326b outputs the result of the process as a text edge signal to the decoding unit 326c. Because the dilation processing unit 326b performs the process in the above manner, it is possible to prevent blurring of the text area caused by fluctuation in results of text identification.

The decoding unit 326c outputs the text separation signal (a C/P signal in FIG. 4). The area identifying unit 326 outputs a color identification result as the color area signal (a B/C signal in FIG. 4). Thus, information corresponding to the text separation signal (2 bits for each pixel) and the color area signal (1 bit for each pixel), i.e., 3 bits in total, is output. In this manner, the segmentation signal containing the text separation signal and the color area signal is output.

Returning to FIG. 1, the scanner γ unit 122 converts the image data (the stored image data, the image data corresponding to the edge area, and the image data corresponding to the picture area) received from the area extracting unit 121 from linear reflectance data to linear density data.

The compression processing unit 103 compresses 8-bit-based RGB image data obtained after scanner correction, the text separation signal (2 bits), and the color area signal (1 bit), and outputs them to a universal bus. The compressed image data, the text separation signal (2 bits), and the color area signal (1 bit) are then sent to the controller 104 via the universal bus. While the image data, the text separation signal (2 bits), and the color area signal (1 bit) are compressed in the embodiment, if a bandwidth of the universal bus is sufficiently wide and the capacity of the HDD 106 is sufficiently large, it is not necessary to compress the image data and the signals.

The controller 104 includes a page memory 131, a compression-expansion processing unit 132, an output-format converting unit 133, a data interface (I/F) unit 134, an input-format converting unit 135, and a device I/F unit 136. The controller 104 outputs image data stored in the HDD 106 to the external PC terminal 130, and receives image data from the external PC terminal 130. The controller 104 also executes a process of inputting operations performed via the input device 110.

The device I/F unit 136 processes information received from the input device 110. The device I/F unit 136 receives an input of the image segmentation mode via the input device 110. The device I/F unit 136 also receives an input of an image processing mode input via the input device 110.

The image processing mode is processing information about a read original. The image processing mode is selected from the following three modes: a text mode in which a process is performed with priority on text; a standard mode in which a process is performed so that text and photograph can be balanced with each other; and a photograph mode in which a process is performed with priority on photograph.

The controller 104 stores input image data in the HDD 106. The controller 104 also stores bibliographic data of the input image data, such as an image size, and information contained in the text separation signal (2 bits) and the color area signal (1 bit) in the HDD 106 in association with the input image data. If the controller 104 receives inputs of the image segmentation mode and the image processing mode together with the image data, the controller 104 can also store the input modes in the HDD 106.

The page memory 131 temporarily stores therein the input image data, the text separation signal (2 bits) and the color area signal (1 bit).

More particularly, the controller 104 stores compressed image data received from the compression processing unit 103 in the HDD 106. Then, when the compressed image data stored in the HDD 106 is reused, the controller 104 reads out the compressed image data from the HDD 106 to the page memory 131.

The compression-expansion processing unit 132 expands the compressed image data stored in the page memory 131 into the original image data, i.e., the 8-bit-based RGB image data, and outputs the 8-bit-based RGB image data to the output-format converting unit 133.

The output-format converting unit 133 converts a color space of the RGB image data into an sRGB color space that is a standard color space, and converts a format of the RGB image data into a universal image format such as a Joint Photographic Experts Group (JPEG) format or a Tag Image File Format (TIFF) format. The output-format converting unit 133 receives the text separation signal (2 bits) and the color area signal (1 bit) corresponding to the input image data via the compression-expansion processing unit 132.

Figure 5:
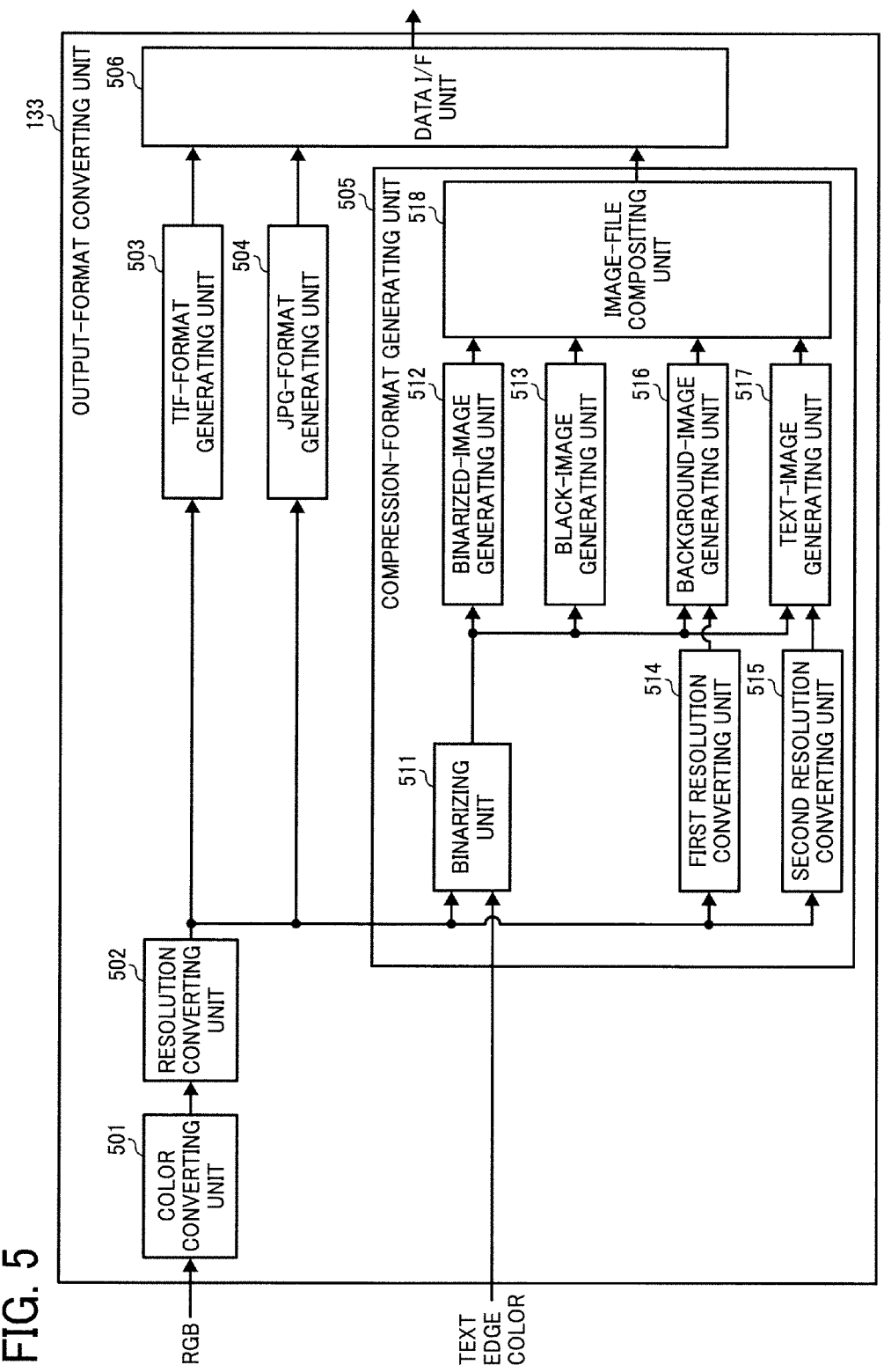
FIG. 5 is a block diagram of an output-format converting unit shown in FIG. 1.

FIG. 5 is a detailed block diagram of the output-format converting unit 133. The output-format converting unit 133 includes a color converting unit 501, a resolution converting unit 502, a TIF-format generating unit 503, a JPG-format generating unit 504, a compression-format generating unit 505, and a data I/F unit 506.

The color converting unit 501 converts the input RGB image data into predetermined RGB image data. The resolution converting unit 502 converts a pixel density of the converted RGB image data into a predetermined pixel density of 300 dpi, 200 dpi, or the like. In the embodiment, the pixel density is converted into 300 dpi.

Each of the TIF-format generating unit 503, the JPG-format generating unit 504, and the compression-format generating unit 505 converts a file format of the image data, of which resolution has been converted, into a corresponding format. The compression-format generating unit 505 is described in detail below.

The compression-format generating unit 505 includes a binarizing unit 511, a binarized-image generating unit 512, a black-image generating unit 513, a first resolution converting unit 514, a second resolution converting unit 515, a background-image generating unit 516, a text-image generating unit 517, and an image-file compositing unit 518.

The binarizing unit 511 outputs binarized image data in which the text area and a non-text area are identified based on the level of the image density, mask image data (2 bits), and black-text image data (1 bit), with respect to each pixel of the image data that is input by the resolution converting unit 502 after the image density of the image data been converted.

The binarizing unit 511 binarizes the image data by using any methods. The binarizing unit 511 serially processes pixels in the first line of the image data one after the other and then serially processes continuous lines one after the other in the same manner until the last line of the image data. In the embodiment, the image data to be processed is assumed as the RGB image data. More particularly, it is assumed that the RGB image data is darkened as pixel values thereof increase and lightened as the pixel values decrease.

The binarizing unit 511 receives the text separation signal (2 bits) and the color area signal (1 bit) via the compression-expansion processing unit 132. Then, the binarizing unit 511 identifies whether each pixel of the received image data is either the text edge area or the other area. A correspondence between each pixel of the image data and the input signals (e.g., the text separation signal (2 bits) and the color area signal (1 bit)) can be determined by using any known methods, and therefore, detailed explanation thereof is omitted.

The binarizing unit 511 sets thresholds for binarizing image data corresponding to the text edge area and image data corresponding to the other area, respectively, and switches over the thresholds depending on the area to be processed. Parameters for the text edge area are set so that the readability of text can be more assured compared to the other area.

The binarizing unit 511 binarizes image data corresponding to the text edge area and the other area by using the corresponding thresholds. Specifically, when at least one pixel values of a pixel of the input RGB image data exceeds the threshold, the binarizing unit 511 identifies the pixel as black (ON), and, when all pixel values of a pixel of the input RGB image data do not exceed the threshold, the binarizing unit 511 identifies the pixel as white (OFF). For example, when the threshold for a pixel is set to such pixel values that R=128, G=120, and B=118, and if a pixel of the input image data has such pixel values that R=121, G=121, and B=121, the binarizing unit 511 identifies the pixel as black. On the other hand, if a pixel of the input image data has such pixel values that R=110, G=110, and B=110, the binarizing unit 511 identifies the pixel as white.

The reason why the thresholds are changed between the text edge area and the other area is that processing contents need to be changed depending on background colors. Specifically, if a single piece of image data contains dark-colored text drawn on a colored background other than a white background and light-colored text drawn on a white background, and the text is subjected to the same image processing by using the same threshold, the text on different-colored backgrounds cannot be uniformly identified as black (ON).

To prevent such a situation, the binarizing unit 511 changes the thresholds between the text edge area and the other area. Accordingly, the threshold for text on a white background and the threshold for text on a colored background other than the white background can be differentiated from each other, so that both light-colored text on the white background and text on the colored background can be identified as black (ON). As a result, the image data can be properly binarized.

In the embodiment, although details will be described later, the text edge area of the image data to be binarized is subjected to an edge enhancement process (a sharpening process) and the other area is subjected to image processing corresponding to the amount of edge. Therefore, the picture area is subjected to a smoothing process. At this time, a background area of the colored background on which text is drawn is also subjected to the smoothing process, so that the image data can be binarized properly.

The binarizing unit 511 generates mask image data (1 bit) for each pixel of the input image data. The mask image data (1 bit) indicates halftone dots and a colored background that is other than the white background.

Specifically, the binarizing unit 511 detects halftone dots from the image data. For example, when a predetermined number of halftone-dot patterns are detected in an area between a white pattern (i.e., a white-colored area without other colors) and another white pattern, the binarizing unit 511 identifies pixels in the halftone-dot patterns as halftone dots. Furthermore, when a predetermined interval is detected between one halftone-dot pattern and another halftone-dot pattern, the binarizing unit 511 identifies pixels in the interval as non halftone dots. As a result, white-colored text on a dark-colored area of a gradational black background can be identified as the non halftone dot. For example, the binarizing unit 511 identifies white-colored text on a dark-colored area of a gradually-lightened background of image data as the non halftone dot. The binarizing unit 511 also identifies a dark-colored area of a gradually-darkened background of the image data as the non halftone-dot because halftone-dot patterns can hardly be detected in the dark-colored area. The binarizing unit 511 also identifies dark-colored text on a light-colored background of the image data as the non halftone-dot because halftone-dot patterns can hardly be detected in the dark-colored text.

Thus, because text is generally drawn on the white background and thereby halftone-dot patterns exist only at around an edge of the text on the white background, it is possible to prevent the text on the white background from being erroneously identified as a halftone-dot area.

While the pattern matching is performed between the white-colored area and the area other than the white-colored area in the embodiment, it is applicable to individually perform the pattern matching for each of Y-component, M-component, and C-component. If halftone-dots are detected individually for each of the Y-component, the M-component, and the C-component, because ink is composed of these components, dot reproducibility of the ink can be accurately detected.

The binarizing unit 511 performs, based on the fact that the text area is relatively dark and the area around the text is relatively light, a process of identifying an area that is lighter than the text area and darker than an area around the text as a gray area having a density of middle level. In the process of identifying the gray area, the white background corresponding to a white pixel obtained after N-th digitization (N is an arbitrary numeric values; for example, eight) is used.

Generally, an area containing text (i.e., the text area) is formed of only a dark-colored pixel area and a light-colored pixel area (e.g., a white background), so that the binarizing unit 511 does not generally detect the gray area from the text area. On the other hand, the picture area (e.g., the photograph area) separated from the text area contains a plurality of tones of colors, so that the binarizing unit 511 detects an area having a density of middle level as the gray area. In the embodiment, the binarizing unit 511 identifies an area as the gray area until the number of white pixels among neighboring pixels of the area exceeds a predetermined threshold.

The binarizing unit 511 also detects a dark-colored pixel as a gray pixel. When a predetermined number or more of black pixels are continued in the gray area, the binarizing unit 511 detects these pixels as non-gray pixels. Then, the binarizing unit 511 identifies an area formed of the gray pixels as the gray area. As a result, the binarizing unit 511 can detect white-colored text on a black background as a non-gray area.

In this manner, the binarizing unit 511 generates the mask image data indicating whether a pixel corresponds to the halftone dot or the gray area for each pixel of the image data.

The binarizing unit 511 includes a text identifying unit (not shown) that identifies a black text area and a color text area.

Then, the binarizing unit 511 outputs for each pixel, as a result of all the above processes, 3-bit data corresponding to the binarized image (binarized areas) for identifying areas of the image data depending on the image segmentation mode, the mask image data (the halftone-dot area or the gray area), and the black text area.

The text identifying unit identifies whether an area is the color text area or the black text area. The identification can be performed by using any known methods.

The text identifying unit performs logical operation on the text separation signal (2 bits) and the color area signal (1 bit) for each pixel of the image data. When the pixel corresponds to the text edge area and does not correspond to the color area, the text identifying unit outputs the pixel as a black-text-edge area.

A tip portion of text of the image data is generally thin, so that it can hardly be identified as a halftone dot (i.e., it can hardly be identified as the non-text area). If the tip portion of the text is identified as the text edge area while a middle portion of the text is identified as the halftone-dot area, the whole text after a black-text identification process results in like incomplete text, resulting in degraded visual quality of the text. However, in the embodiment, because the MFP 100 performs the processes as described above, it is possible to prevent the middle portion of the text from being erroneously identified as the halftone-dot area. As a result, the degradation in visual quality of the text can be prevented.

The binarized-image generating unit 512 performs a Modified Modified Relative Element Address Designate codes (MMR) compression that is a lossless compression on the binarized image data and the mask image data. The black-image generating unit 513 performs the MMR compression that is a lossless compression on the black-text image data.

Figure 6:
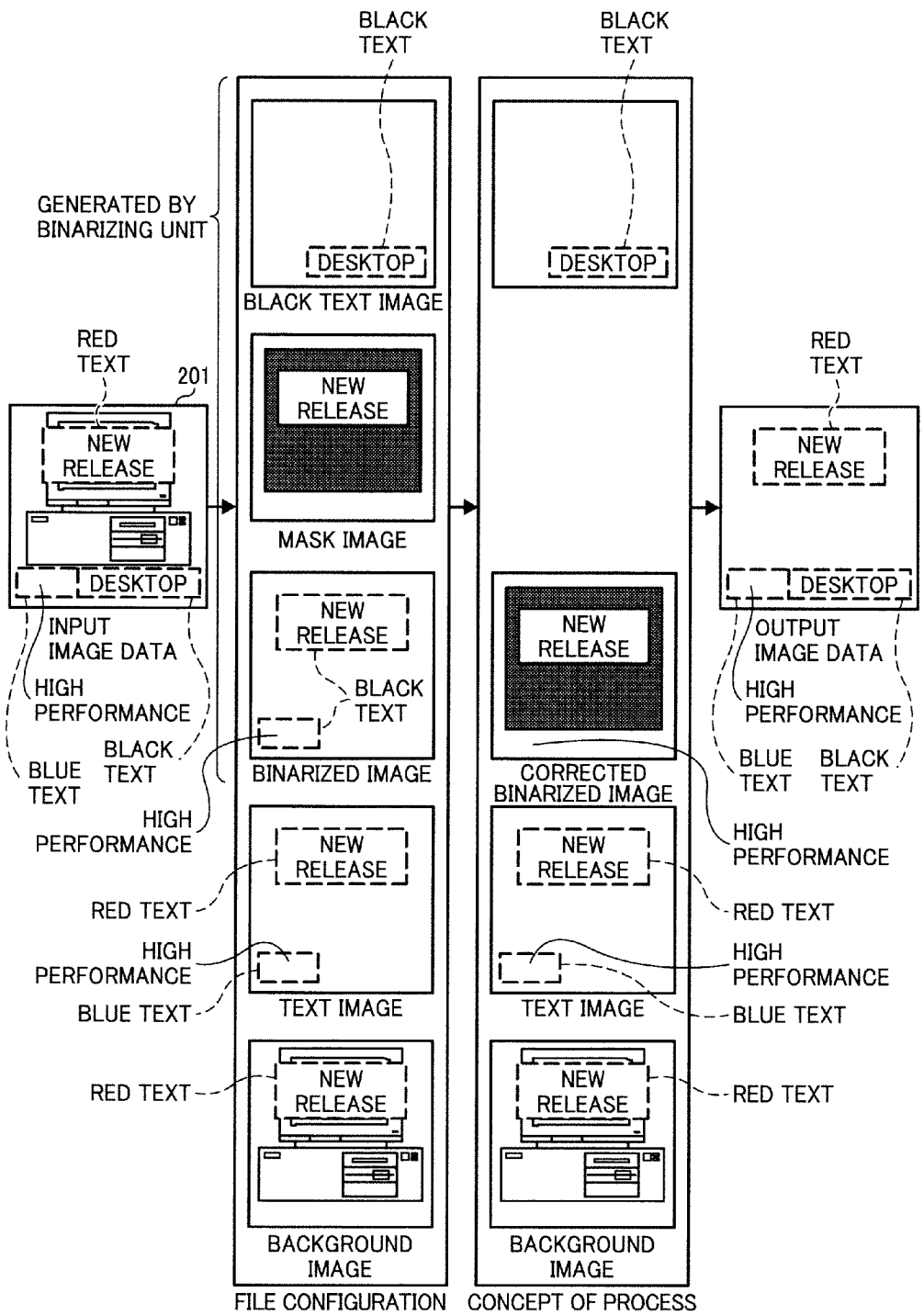
FIG. 6 is a schematic diagram for explaining a configuration of image data converted by the output-format converting unit shown in FIG. 5.

FIG. 6 is a schematic diagram for explaining a configuration of image data converted by the output-format converting unit 133. The binarizing unit 511 generates the black-text image data, the mask image data, and the binarized image data from the input image data 201.

The first resolution converting unit 514 and the second resolution converting unit 515 perform a resolution conversion on the image data to generate image data having low resolution (e.g., 150 dpi).

The background-image generating unit 516 performs a lossy compression (e.g., JPG compression) to compress image data that is not masked by the mask image data and is part of the binarized image data output by the binarizing unit 511 into image data of an area formed of pixels having predetermined pixel values to be white.

The text-image generating unit 517 performs a lossy compression (e.g., JPG compression) to compress the image data other than the binarized image data into image data formed of pixels having predetermined constant pixel values.

In the embodiment, image data of a background image is converted into image data formed of pixels having predetermined constant pixel values so that compressibility can be increased. Image data of a background area in text image data is also converted into image data formed of pixels having predetermined constant pixel values so that compressibility can be increased.

In the resolution conversion performed by the resolution converting unit 502, a resolution of a text image need not be set as high as that of a background image. Therefore, the resolution of the text image can be set to, for example, about 75 dpi. When the text mode is selected as the image processing mode, the resolution converting unit 502 generates an image file in JPG format by setting the resolution of each of the background image and the text image to 75 dpi. The reason why the resolution of the text image can be decreased is that the resolution of the text image is assured by the MMR compression that is a lossless compression, and thereby, tone degradation because of decrease in the resolution of the JPG image does not cause problems with the text image. Thus, in the MFP 100, a file size can be reduced by decreasing the resolution of the text image. While the file size is reduced by decreasing the resolution of the text image in the embodiment, the file size can be reduced by decreasing image quality, such as the number of gradations of the image data, other than the resolution.

In the HDD 106, the image processing mode is stored as the bibliographic data of the image data in association with the stored image data. If the text mode is selected as the image processing mode, compressibility of image data corresponding to all the text areas in the stored image data can be increased.

In the embodiment, a background image is generated by superimposing the mask image on the image of the stored image data, and a text image is generated by superimposing the binarized image on the image of the stored image data. In some cases, both the text image and the background image contain the same information. The reason why the same information may be redundantly contained in both the text image and the background image is that the information is necessary when the input-format converting unit 135 switches over processing contents of image processing depending on the image segmentation mode.

The background-image generating unit 516 and the text-image generating unit 517 perform JPG compression by using quantization tables having different characteristics, respectively. The JPG compression can be performed by using known techniques, for example, a method disclosed in Japanese Patent Application Laid-open No. 2005-303979.

Specifically, the background-image generating unit 516 and the text-image generating unit 517 perform the JPG compression by clipping out image data in units of block (e.g., in units of 8×8 pixels) and then performing discrete cosine transform (DCT) to represent the clipped out DCT block data in frequency space.

At this time, a quantization process by which compression level is determined is performed by using a different standard quantization table for each of Y-component and CbCr component.

A quantization table value $Q'ij$ actually used in the quantization process is calculated by using a quality factor (qf) with respect to a standard quantization table value $Qij$. The qf is set to a value in a range from 0 to 100. When the qf is smaller than 50, the quantization table value $Q'ij$ is calculated by the following Equation (1):

$$Q'ij = Qij/qf \quad (1)$$

When the qf is equal to or larger than 50, the quantization table value $Q'ij$ is calculated by the following Equation (2):

$$Q'ij = Qij \times (100-qf)/50 \quad (2)$$

A general standard quantization table is generated based on the fact that the human eye is sensitive to low-frequency waves and insensitive to high-frequency waves. Furthermore, in the general standard quantization table, because color information is less identified compared to brightness information, more amount of frequencies are cut off for the color information compared to the brightness information.

In the embodiment, however, the background-image generating unit 516 performs the quantization process by using the qf of about 20 to 30 to compress image data. Therefore, if the general standard quantization table is used, block noise is more likely to occur. Particularly, the block noise for each unit of the JPG compression (e.g., each block of 8×8 pixels) is largely affected by a value of a DC component that represents an average density of each block. To reduce the block noise for each unit of the JPG compression, such a standard quantization table that can retain values of DC components of a brightness difference and a color difference is employed in the embodiment. The standard quantization table in this case can be any known standard quantization tables, and therefore, detailed explanation thereof is omitted. For example, when the qf is set to 25, a quantization table to be actually used in the quantization process is obtained through a calculation based on Equation (1) and the standard quantization table. Then, the background-image generating unit 516 performs the quantization process by using the obtained quantization table.

When the text-image generating unit 517 performs the JPG compression by using the general standard quantization table, color mixture may occur. To prevent the color mixture, the text-image generating unit 517 uses such a standard quantization table that can retain the whole frequencies of a color difference component. The standard quantization table in this case can be any known standard quantization tables, and therefore, detailed explanation thereof is omitted. Then, a quantization table to be actually used in the quantization process is obtained based on the standard quantization table and a value obtained through a calculation using the qf set to 20. The brightness component in the obtained quantization table is not practically important because the resolution of the text image is determined by the resolution obtained through the MMR compression. The text-image generating unit 517 performs the quantization process by using the obtained quantization table.

Thus, in the quantization table used for the background image, the DC components of a brightness difference and a color difference are retained, so that the block noise in a smooth area in an image can be reduced. On the other hand, in the quantization table for the text image, the color difference component is retained by retaining higher frequency components compared to the quantization table for the background image that retains the brightness difference component, so that color mixture in each block of 8×8 pixels can be prevented.

In other words, in the quantization table for the background image, priority is given to the DC components of both the brightness difference and the color difference. On the other hand, in the quantization table for the text image, priority is given to frequencies of the color difference while a standard brightness component is maintained.

The image-file compositing unit 518 composites four pieces of image data output by the binarized-image generating unit 512 (through the MMR compression), the black-image generating unit 513 (through the MMR compression), the background-image generating unit 516 (through the JPG compression), and the text-image generating unit 517 (through the JPG compression) to generated one piece of image data. At this time, a file format can be a universal file format (e.g., portable document format (PDF)). The image-file compositing unit 518 can output the four pieces of the image data separately to the input-format converting unit 135.

The data I/F unit 506 outputs image data in a format to be output to the NIC 105 or outputs the four pieces of the image data to be output to the input-format converting unit 135.

Returning to FIG. 1, the data I/F unit 134 outputs the image data received from the output-format converting unit 133 to the NIC 105 or to the input-format converting unit 135.

The input-format converting unit 135 converts a format of the image data into an arbitrary format and outputs the image data in the converted format.

Figures 7, 8:
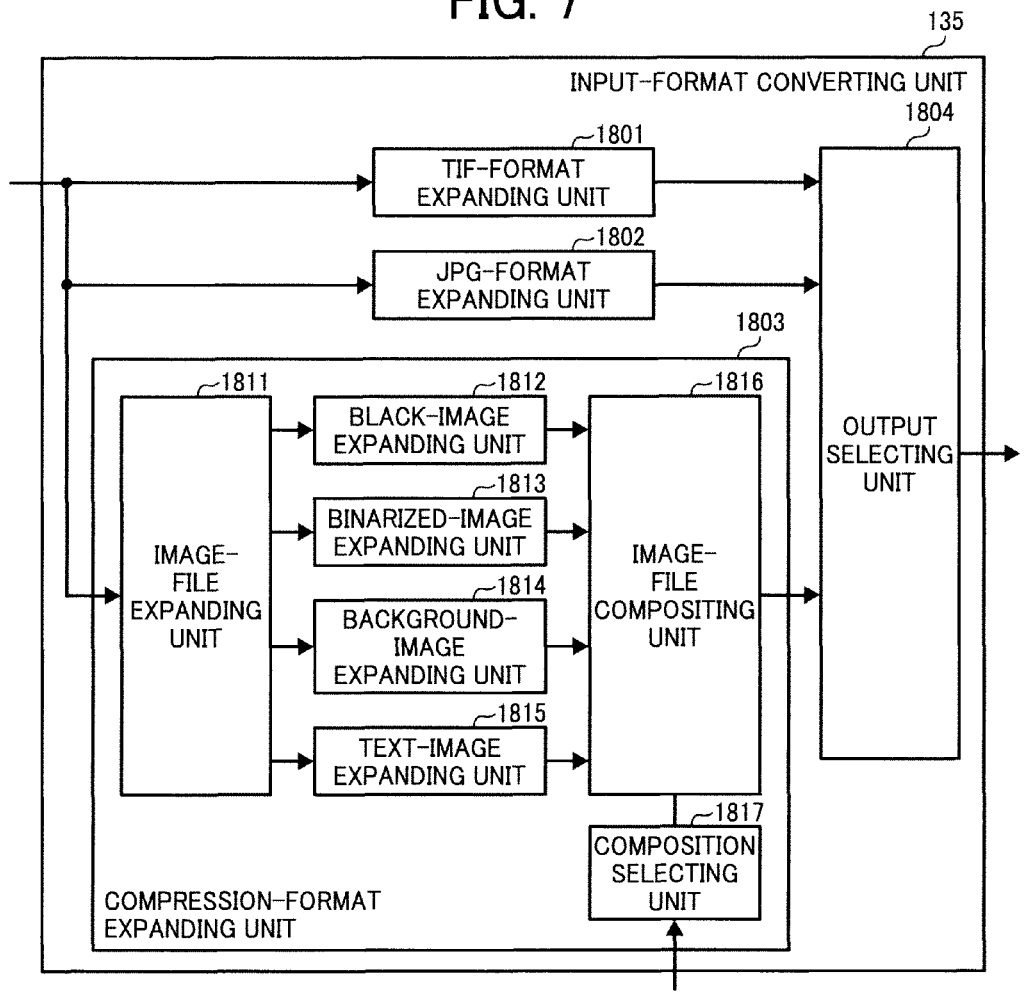
FIG. 7 is a block diagram of an input-format converting unit shown in FIG. 1.
FIG. 8 is a schematic diagram illustrating criteria stored in a criterion storage unit, which indicates correspondence between signals when an image segmentation mode is a standard mode.

FIG. 7 is a block diagram of the input-format converting unit 135. The input-format converting unit 135 includes a TIF-format expanding unit 1801, a JPG-format expanding unit 1802, a compression-format expanding unit 1803, and an output selecting unit 1804.

Each of the TIF-format expanding unit 1801, the JPG-format expanding unit 1802, and the compression-format expanding unit 1803 expands image data into bitmap data in each corresponding format.

The output selecting unit 1804 selects one format from the three formats expanded by the TIF-format expanding unit 1801, the JPG-format expanding unit 1802, and the compression-format expanding unit 1803, and outputs the image data in the selected format. At the same time, the output selecting unit 1804 coverts RGB data of the image data into YMCBk image data.

For example, when the input image data is in TIF format, the TIF-format expanding unit 1801 expands the image data into bitmap data. When the input image data is in JPG format, the JPG-format expanding unit 1802 expands the image data into bitmap data. When the input image data is in compressed format, the compression-format expanding unit 1803 expands the image data into bitmap data.

The compression-format expanding unit 1803 includes an image-file expanding unit 1811, a black-image expanding unit 1812, a binarized-image expanding unit 1813, a background-image expanding unit 1814, a text-image expanding unit 1815, an image-file compositing unit 1816, and a composition selecting unit 1817. The compression-format expanding unit 1803 performs processing on the four pieces of image data received from the output-format converting unit 133.

The image-file expanding unit 1811 outputs each of the four files in an image data file generated by the compression-format generating unit 505 (see FIG. 5) as image data to corresponding one of the black-image expanding unit 1812, the binarized-image expanding unit 1813, the background-image expanding unit 1814, and the text-image expanding unit 1815.

The binarized-image expanding unit 1813 expands the MMR-compressed image data into bitmap data of the binarized image and the mask image.

The black-image expanding unit 1812 expands the MMR-compressed image data into bitmap data of the black text image.

The background-image expanding unit 1814 expands image data of the background image in the JPG format into bitmap data. The text-image expanding unit 1815 expands image data of the text image in the JPG format into bitmap data.

The composition selecting unit 1817 selects an expansion method and a composition method based on the image segmentation mode received from the page memory 131.

The image-file compositing unit 1816 composites the four pieces of the expanded bitmap data to generate one piece of bitmap data by using the composition method selected by the composition selecting unit 1817.

When the composition selecting unit 1817 selects the standard mode as the image segmentation mode, and when there is image data of a binarized image that does not contain a mask image, the binarized-image expanding unit 1813 outputs image data of a corrected binarized image. Upon receiving the image data of the corrected binarized image from the binarized-image expanding unit 1813, the image-file compositing unit 1816 outputs pixels of image data received from the text-image expanding unit 1815. Upon receiving image data other than the image data of the corrected binarized image from the binarized-image expanding unit 1813, the image-file compositing unit 1816 outputs pixels of image data received from the background-image expanding unit 1814. When a result received from the black-image expanding unit 1812 indicates black text, the image-file compositing unit 1816 outputs black pixels as pixels of image data. Then, image data of one image is generated by the output pixels. The resolutions of the text area and the non-text area correspond to the resolutions of the binarized image.

When the composition selecting unit 1817 selects the text mode as the image segmentation mode, and when there is image data of a binarized image, the binarized-image expanding unit 1813 outputs image data of a corrected binarized image. Upon receiving the image data of the corrected binarized image, the image-file compositing unit 1816 outputs pixels of image data received from the text-image expanding unit 1815. When the image data received from the binarized-image expanding unit 1813 is not the corrected binarized image, the image-file compositing unit 1816 outputs pixels of image data received from the background-image expanding unit 1814. At this time, because information about a text image is contained in a mask image (a background image) at the boundary between the corrected binarized image and the mask image (i.e., information about text on the background image is mixed due to image compression), image data in a boundary area is replaced with image data of a surrounding image. When a result received from the black-image expanding unit 1812 corresponds to black text, the image-file compositing unit 1816 outputs black pixels as pixels of image data. Then, image data of one image is generated by the output pixels. The resolutions of the text area and the non-text area correspond to the resolution of the binarized image.

In the example shown in FIG. 6, when the standard mode is selected as the image segmentation mode, the text "new release" is identified as a picture, so that if the size of the text "new release" is small, the readability of the text in an output image may be decreased. On the other hand, when the text mode is selected as the image segmentation mode, the text "new release" is identified as text, so that the text can be subjected to image processing suitable for text. As a result, the readability of the text in an output image can be increased.

In this manner, image data is generated based on the image segmentation mode selected by a user and results of processes of identifying areas of the image of the image data. Therefore, a desired image data can be generated according to user's need. The same processes can be applied when generating image data to be displayed on a monitor instead of the image data to be printed out on a paper.

The generated image data is compressed by the compression-expansion processing unit 132, and then stored in the HDD 106 in association with various signals or output to the expansion processing unit 107 with the various signals via the universal bus so that an image of the image data can be printed out.

Returning to FIG. 1, the controller 104 outputs the image data stored in the HDD 106 to the expansion processing unit 107 via the universal bus.

The expansion processing unit 107 expands the compressed image data into the original 8-bit-based RGB image data, the text separation signal (2 bits), and the color area signal (1 bit), and then outputs the expanded data and signals to the printer correcting unit 108. The image data to be stored in the expansion processing unit 107 can be image data extracted with respect to each area and stored in the HDD 106 or image data composited by the input-format converting unit 135. In the following description, it is assumed that the image data extracted with respect to each area and stored in the HDD 106 is input in the expansion processing unit 107.

The printer correcting unit 108 includes a halftone processing unit 141, a printer γ unit 142, a color-correction processing unit 143, an edge-amount detecting unit 144, a criterion storage unit 145, a selecting unit 146, and a filtering processing unit 147. The printer correcting unit 108 performs a correction process on the image data.

The criterion storage unit 145 stores therein a criterion used for converting the text separation signal (i.e., the text information (1 bit) indicating whether a pixel corresponds to a text edge and the picture information (1 bit) indicating whether the pixel corresponds to the picture area) and the color area signal (1 bit) into a text-edge area signal.

FIG. 8 is a schematic diagram illustrating criteria stored in the criterion storage unit 145, which indicates correspondence between signals when the image segmentation mode is the standard mode. For example, a record 1901 indicates that when a pixel is identified as both the edge area and the picture area in the standard mode, the pixel is resultantly identified as the other (picture) area regardless of a result about the color area. As a result, the text-edge area signal is set as "NO".

FIG. 9 is a schematic diagram illustrating criteria stored in the criterion storage unit 145, which indicates correspondence between signals when the image segmentation mode is the text mode. For example, a record 2001 indicates that when a pixel is identified as both the edge area and the picture area, the pixel is resultantly identified as the color-text-edge area regardless of a result about the color area. As a result, the text-edge area signal is set as "YES".

The selecting unit 146 converts the text separation signal (2 bits) and the color area signal (1 bit) into the text-edge area signal (1 bit) based on the correspondence stored in the criterion storage unit 145 and the image segmentation mode input by the user.

In other words, the selecting unit 146 generates the text-edge area signal (1 bit) that is used for identifying the color-text-edge area and the black-text-edge area based on the text separation signal and the color area signal that are used for identifying the edge area, the picture area, and the color area.

The filtering processing unit 147 switches over processing contents of a filtering process to be performed on each pixel based on the picture information (1 bit) that indicates whether the pixel corresponds to the picture area and is contained in the text separation signal (2 bits), and the text-edge area signal (1 bit). Specifically, the filtering processing unit 147 performs an edge enhancement process (a sharpening process) on the text edge area (both the black-text-edge area and the color-text-edge area are contained) so that the readability of text can be increased.

The filtering processing unit 147 performs a smoothing process or the edge enhancement process (the sharpening process) on the color area such as the photograph area based on an edge amount that indicates a steeply-changed density of the image data. An edge corresponding to the steeply-changed density is enhanced so that the readability of text contained in photograph, graphics, or graphs can be increased. In the text edge area, thresholds used for binarization can be changed between the color-text-edge area and the black-text-edge area in consideration of the color area.

The color-correction processing unit 143 converts RGB image data into YMCBk image data, and replaces image data of an area that corresponds to the text-edge area signal but does not correspond to the color area signal into black (Bk) monochrome data of black text.

More particularly, the color-correction processing unit 143 converts RGB image data of an area other than the black-text-edge area into CMY image data by using a first-order masking method for adjusting density or the like. Then, the color-correction processing unit 143 generates Bk data by performing an under color removal (UCR) process on an area common to C data, M data, and Y data so that color reproducibility of the image data can be improved, and outputs the CMYBk data.

If black text in the black-text-edge area is colored because scanning positions of RGB image data scanned by the scanner 101 are shifted, or if color shift occurs on YMCBk image data when the YMCBk image data is printed out by the plotter 109, the readability of the text decreases. To prevent such a situation, the color-correction processing unit 143 outputs a signal corresponding to the brightness as Bk monochrome data for the black-text-edge area (i.e., the Y data, the M data, and the C data are pieces of data that are not printed out).

The printer γ unit 142 performs a γ correction process on the image data based on the γ characteristics of the plotter 109. In the embodiment, the printer γ unit 142 selects γ for the color-text-edge area and the black-text-edge area so that contrast in these areas can be intensified, and selects γ for the other area (i.e., the picture area) so that characteristics of input data can be substantially maintained, based on the γ characteristics. Then, the printer γ unit 142 performs the γ correction process by using the selected γ characteristics.

The edge-amount detecting unit 144 detects the steeply-changed density of the image data as the edge amount.

The halftone processing unit 141 performs a quantization process such as a dithering process or an error diffusion process on the image data to correct tone of the image data. In other words, the halftone processing unit 141 performs a correction process or a tone conversion process based on the tone characteristics of the plotter 109. The tone conversion process in the embodiment corresponds to a process for converting the 8-bit-based image data into 2-bit image data through the error diffusion process or the dithering process.

In the embodiment, the halftone processing unit 141 performs the quantization process such as the dithering process based on the tone characteristics of the plotter 109 or the edge amount and the image segmentation mode input by a user. In the quantization process, the color-text-edge area and the black-text-edge area are subjected to a process that gives priority to the resolution to increase sharpness of text, and the other area (i.e., the picture area) is subjected to a process that gives priority to the tone. As a result, the readability of the text can be increased.

FIG. 10 is a schematic diagram illustrating processing contents of processing performed on each area in each image processing mode. The processing contents of the processing performed on each area are changed depending on whether the image segmentation mode is the standard mode, the text mode, or the photograph mode. In the example shown in FIG. 10, the processing contents in, for example, fields 2101 and 2102 are different from those set for the standard mode.

Returning to FIG. 1, the plotter 109 functions as a printing unit that prints out an image of image data on a transfer sheet by performing a laser-beam writing process. Specifically, the plotter 109 draws a latent image of 2-bit image data on a photosensitive element, performs an image forming process and an image transfer process on the latent image with toner, and forms a copy image of the image data on a transfer sheet.

The NIC 105 transmits and receives data, e.g., image data, to and from the external PC terminal 130.

When the MFP 100 functions as a transmission scanner that transmits image data to the external PC terminal 130 via a network, the image data is firstly sent to the controller 104 via the universal bus. Then, the controller 104 performs a color conversion process, a tone process, a format process, and the like on the image data. In the tone process, the controller 104 performs a tone conversion process corresponding to the mode in which the MFP 100 functions as the transmission scanner. In the format process, the controller 104 converts a format of the image data into a universal image format such as JPG format or TIF format. Then, the controller 104 transmits the image data to the external PC terminal 130 via the NIC 105.

When the MFP 100 functions as a printer that prints out an image of data received from the external PC terminal 130 via the network, the controller 104 analyzes the image and a command indicating a print instruction in the data received from the external PC terminal 130 via the NIC 105. Then, the controller 104 expands the data into printable bitmap data as image data, compresses the expanded image data, and then stores therein the compressed image data. The stored image data is then written to the HDD 106 that is a large capacity storage unit as needed. When the image data is written to the HDD 106, bibliographic data of the image data is also written to the HDD 106.

A process procedure for outputting the image data received from the external PC terminal 130 to the plotter 109 is described below. A central processing unit (CPU) (not shown) analyzes a command instructed by the external PC terminal 130, and writes the command in the page memory 131. Upon receiving the image data, the data I/F unit 134 outputs the image data to the input-format converting unit 135. Then, the input-format converting unit 135 expands the image data into bitmap data, and the compression-expansion processing unit 132 compresses the image data. The image data is written to the page memory 131, and then stored in the HDD 106. The image data is expanded by the input-format converting unit 135 into normal image data in JPG format or TIF format.

The controller 104 sends the image data stored in the HDD 106 to the expansion processing unit 107 via the universal bus. The expansion processing unit 107 expands the compressed image data into the original 8-bit-based image data, and then sends the expanded image data to the printer correcting unit 108. When the input image data is RGB image data, the printer correcting unit 108 causes the color-correction processing unit 143 to convert the RGB image data into YMCBk image data. Then, each color data of the YMCBk image data is subjected to the γ correction process, the halftone process, and the like such that the correction process, the tone conversion process, and the like are performed based on the tone characteristics of the plotter 109. In the tone conversion process at this time, the 8-bit-based image data is converted into 2-bit image data through the error diffusion process or the dithering process. Then, the plotter 109 draws a latent image of 2-bit image data on a photosensitive element, performs an image forming process and an image transfer process on the latent image with toner, and forms a copy image of the image data on a transfer sheet.

In the MFP 100, the scanner 101 reads an original, converts image data of the read original into digital data, and segments an image of the image data into a plurality of areas based on characteristics of each area of the image. Then, various image processing is performed on the image data with respect to each area containing a target pixel based on a result of identifying a type of each area. As a result, image quality of an output image can be largely improved.

Figure 11:
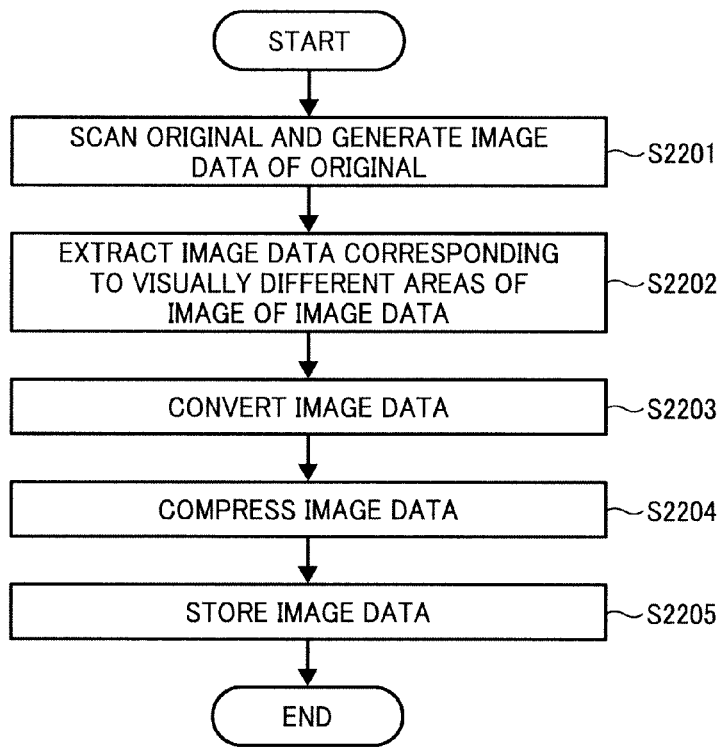
FIG. 11 is a flowchart of a procedure of a process performed by the MFP shown in FIG. 1 from reading of an original to storing of image data of the original in an HDD.

A process performed by the MFP 100 from reading of an original to storing of image data of the original in the HDD 106 is described below. FIG. 11 is a flowchart of a procedure of a process performed by the MFP 100 from reading of an original to storing image data of the original in the HDD 106.

The scanner 101 scans an original and generates image data of the original (Step S2201).

The area extracting unit 121 of the scanner correcting unit 102 extracts image data corresponding to visually different areas of an image of the image data of the original (Step S2202). Then, the area extracting unit 121 outputs the segmentation signal and the color area signal generated for each pixel of the image data based on the extracted areas. The extracted areas can be the edge area, the picture area (e.g., the photograph area) other than the edge area, and the color area.

The scanner γ unit 122 converts image data (the stored image data, the image data corresponding to the edge area, and the image data corresponding to the picture area) from linear reflectance data to linear density data (Step S2203).

The compression processing unit 103 then compresses the image data (the stored image data, the image data corresponding to the edge area, and the image data corresponding to the picture area) (Step S2204).

The controller 104 stores the image data in the HDD 106 (Step S2205).

Thus, the image data corresponding to the extracted areas are stored in the HDD 106.

Figure 12:
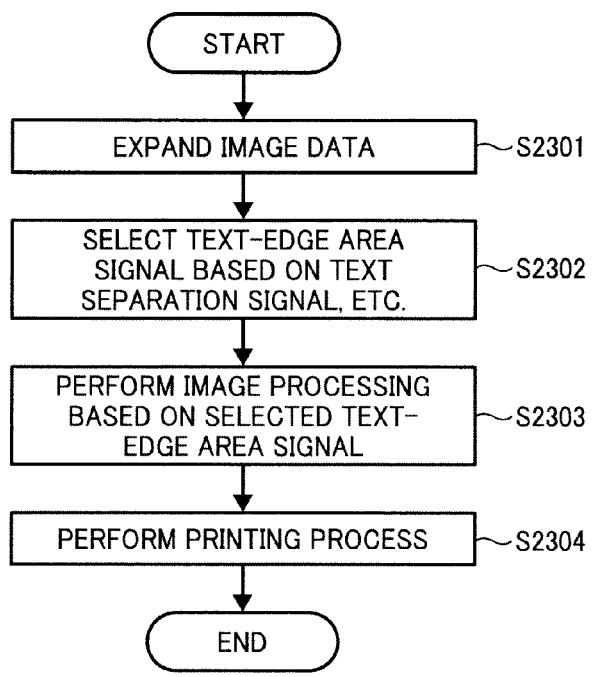
FIG. 12 is a flowchart of a procedure of a process from processing on the image data stored in the HDD to printing of the image data by a plotter in the MFP shown in FIG. 1.

A process from processing on the image data stored in the HDD 106 to printing of the image data by the plotter 109 in the MFP 100 is described below. FIG. 12 is a flowchart of a procedure of a process from processing on the image data stored in the HDD to printing of the image data by the plotter 109 in the MFP 100.

The expansion processing unit 107 receives the image data from the HDD 106, from the controller 104 (i.e., the stored image data, the image data corresponding to the edge area, and the image data corresponding to the picture area), the text separation signal, and the color area signal, and then expands the image data (Step S2301). The printer correcting unit 108 receives inputs of the image processing mode and the image segmentation mode from the controller 104. The image processing mode and the image segmentation mode are input via the input device 110.

The selecting unit 146 selects the text-edge area signal (1 bit) based on the text separation signal (2 bits), the color area signal (1 bit), the correspondence stored in the criterion storage unit 145, and the image segmentation mode input by a user (Step S2302). Based on the selected text-edge area signal (1 bit), whether each area is the text area can be identified.

The filtering processing unit 147 performs a predetermined filtering process on each area based on the picture information (1 bit), which indicates whether the pixel corresponds to the picture area and is contained in the text separation signal (2 bits), and the text-edge area signal (1 bit). Then, the color-correction processing unit 143, the printer γ unit 142, and the halftone processing unit 141 perform predetermined image processing, which is set for each area, on each area identified by the text-edge area signal (1 bit) and the color area signal (Step S2303).

Then, the plotter 109 prints out an image of the above processed image data (Step S2304).

In this manner, the MFP 100 can perform different image processing depending on the input image processing mode and the image segmentation mode every time a process such as a printing process is performed on the image data stored in the HDD 106. Therefore, it is possible to perform image processing suitable for use purpose of the image data.

Furthermore, in the MFP 100, image data of read original is stored in the HDD 106 in association with image data of each area of the original, such as the black-text area or the picture area. The MFP 100 performs processes suitable for each area depending on the image processing mode and the image segmentation mode input by the user, and then performs the printing process. Therefore, it is not necessary to read the original every time the modes are changed. As a result, operability can be improved. Furthermore, it is not necessary to perform a process for extracting the areas, which needs to be performed every time the original is read, so that a processing speed can be increased. Moreover, the image data can be printed out under a desired condition in a proper manner, users' usability can be enhanced.

The MFP 100 is configured to enable a user to select an identification criterion, for example, whether to give priority to text or picture. Therefore, desired image data can be generated.

The hardware configuration of the controller 104 of the MFP 100 is described below. The controller 104 includes the CPU, a north bridge (NB), a system memory (MEM-P), a south bridge (SB), and a local memory (MEM-C), although they are not shown. The scanner correcting unit 102, the compression processing unit 103, the printer correcting unit 108, and the expansion processing unit 107 can be mounted inside the application specific integrated circuit (ASIC) (not shown) connected to the controller 104. In this situation, the controller 104 and the ASIC need to be connected via a PCIe (PCI Express). The MEM-P includes a read only memory (ROM) (not shown) and a random access memory (RAM) (not shown).

The CPU entirely controls the MFP 100, includes a chipset accommodating the NB, the MEM-P, and the SB, and is connected to other units via the chipset.

The NB is a bridge for connecting the CPU to the MEM-P, the SB, and the PCIe. The NB includes a memory controller (not shown) and a PCIe master (not shown). The memory controller controls reading and writing of data to the MEM-P.

The MEM-P is a system memory used as a memory for storing computer programs and data, a memory for loading the computer programs and data, and a memory for drawing data by a printer. The MEM-P includes the ROM and the RAM. The ROM is a read only memory used for storing computer programs and data. The RAM is a writable and readable memory that functions as the page memory 131 and is used for memories for loading the computer programs and data and for drawing data by a printer.

The ASIC is an integrated circuit (IC) that includes hardware elements for image processing and performs image processing.

An image processing programs to be executed by the ASIC or the controller 104 of the MFP 100 is stored in a storage medium such as the ROM for distribution.

The image processing programs to be executed by the MFP 100 can be stored, for distribution, in other computer readable recording media such as a CD-ROM, a flexible disk (FD), a CD-R, or a digital versatile disk (DVD) in an installable file format or a computer-executable file format.

The image processing programs to be executed by the MFP 100 can also be stored in a computer connected to the MFP 100 via a network such as the Internet such that the image processing programs can be downloaded via the network. Furthermore, the image processing programs can be provided or distributed via the network such as the Internet.

The image processing programs has a module configuration including the above units. As the actual hardware configuration, when the CPU (processor) reads and executes the image processing programs from the ROM, the above units are loaded on a main memory and generated on the main memory.

According to one aspect of the present invention, an image processing apparatus stores image data that contains visually different areas, identifies the areas as processing areas based on a image segmentation mode set by a user, and performs image processing on each processing area based on the image segmentation mode set by the user. Therefore, it is possible to output desired image data through processing corresponding to user's need without inputting of the image data every time the image data is output. Thus, user's usability can be enhanced.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. An image processing apparatus, comprising:
    a data receiving unit that receives image data;
    an extracting unit that extracts pieces of image data corresponding to visually different image areas of an image of the image data received by the data receiving unit;
    a first storage unit that stores therein the pieces of the image data extracted by the extracting unit;
    a second storage unit that stores therein a plurality of criteria for identifying each of the image areas as one of processing areas that are subjected to different image processing depending on an image segmentation mode for segmenting the image data into the processing areas;
    a mode receiving unit that receives a selection of the image segmentation mode from a user;
    a criterion selecting unit that selects one of the criteria stored in the second storage unit based on the image segmentation mode selected by the user by using the mode receiving unit;
    an area identifying unit that identifies each of the image areas of the pieces of the image data stored in the first storage unit as one of the processing areas based on the criterion selected by the criterion selecting unit; and
    an image processing unit that performs image processing associated with each of the processing areas on the processing areas identified by the area identifying unit,
    wherein the extracting unit includes
        an edge extracting unit that extracts an edge area from the image data; and
        a color extracting unit that extracts a color area having a predetermined color from the image data;
    the second storage unit stores therein a plurality of criteria based on correspondence of each of the image areas with the edge area and the color area;
    the area identifying unit identifies each of the image areas as one of the processing areas based on the criterion selected by the criterion selecting unit; and
    the second storage unit stores therein a first criterion for identifying an image area corresponding to the edge area as a processing area to be subjected to image processing for text and a second criterion for identifying an image area corresponding to both the edge area and the color area as a processing area to be subjected to image processing for text.

2. The image processing apparatus according to claim 1, further comprising a display processing unit that displays image data containing image data corresponding to a text area among the image areas after corresponding image processing is performed.

3. An image forming apparatus comprising:
    a data receiving unit that receives image data;
    an extracting unit that extracts pieces of image data corresponding to visually different image areas of an image of the image data received by the data receiving unit;
    a first storage unit that stores therein the pieces of the image data extracted by the extracting unit;
    a second storage unit that stores therein a plurality of criteria for identifying each of the image areas as one of processing areas that are subjected to different image processing depending on an image segmentation mode for segmenting the image data into the processing areas;
    a mode receiving unit that receives a selection of the image segmentation mode from a user;
    a criterion selecting unit that selects one of the criteria stored in the second storage unit based on the image segmentation mode selected by the user by using the mode receiving unit;
    an area identifying unit that identifies each of the image areas of the pieces of the image data stored in the first storage unit as one of the processing areas based on the criterion selected by the criterion selecting unit; and
    an image processing unit that performs image processing associated with each of the processing areas on the processing areas identified by the area identifying unit,
    wherein the extracting unit includes
        an edge extracting unit that extracts an edge area from the image data; and
        a color extracting unit that extracts a color area having a predetermined color from the image data;
    the second storage unit stores therein a plurality of criteria based on correspondence of each of the image areas with the edge area and the color area;
    the area identifying unit identifies each of the image areas as one of the processing areas based on the criterion selected by the criterion selecting unit; and
    the second storage unit stores therein a first criterion for identifying an image area corresponding to the edge area as a processing area to be subjected to image processing for text and a second criterion for identifying an image area corresponding to both the edge area and the color area as a processing area to be subjected to image processing for text.

4. An image processing method implemented by an image processing apparatus including a first storage unit that stores therein pieces of image data corresponding to visually different image areas of an image of original image data; and a second storage unit that stores therein a plurality of criteria for identifying each of the image areas as one of processing areas that are subjected to different image processing depending on an image segmentation mode for segmenting the image data into the processing areas, the image processing method comprising:
    first receiving including receiving image data;
    extracting the pieces of the image data corresponding to the image areas from the image data received at the first receiving;
    storing the pieces of the image data corresponding to the image areas extracted at the extracting in the first storage unit;
    selecting one of the criteria stored in the second storage unit based on the image segmentation mode selected by the user;

second receiving including receiving a selection of the image segmentation mode from a user;

identifying each of the image areas as one of the processing areas based on the selection of the image segmentation mode received at the second receiving; and performing image processing associated with each of the processing areas on the processing areas identified at the identifying, wherein the extracting step includes extracting an edge area from the image data; and extracting a color area having a predetermined color from the image data;

the second storage unit stores therein a plurality of criteria based on correspondence of each of the image areas with the edge area and the color area;

the identifying step includes identifying each of the image areas as one of the processing areas based on the criterion selected in the selecting step; and the second storage unit stores therein a first criterion for identifying an image area corresponding to the edge area as a processing area to be subjected to image processing for text and a second criterion for identifying an image area corresponding to both the edge area and the color area as a processing area to be subjected to image processing for text.

5. A computer program product comprising a non-transitory computer-readable medium having computer readable program codes embodied in the medium that, when executed, cause a computer to execute the image processing method according to claim 4.

* * * * *